Figure 1:
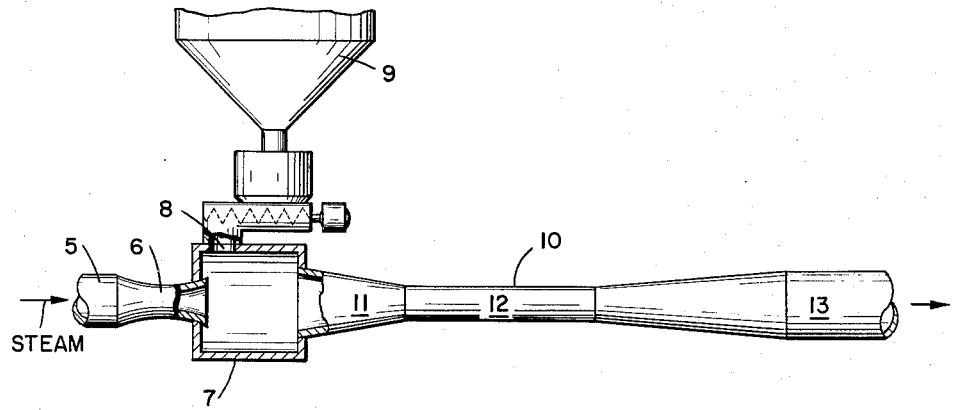

April 19, 1966 K. J. YAP ETAL 3,246,683
PREPARING SLURRY MIXTURES OF PULVEROUS SOLIDS AND WATER
Filed June 28, 1963

INVENTORS:
KIE JAN YAP
ARIE P. DEN HARTOG
BY: Oswald H. Milmore
THEIR ATTORNEY 3,246,683
PREPARING SLURRY MIXTURES OF PULVEROUS SOLIDS AND WATER
Kie Jan Yap and Arie Pieter den Hartog, Amsterdam, Netherlands, assignors to Shell Oil Company, New York, N.Y., a corporation of Delaware
Filed June 28, 1963, Ser. No. 291,505
Claims priority, application Netherlands, July 24, 1962, 281,308
6 Claims. (Cl. 159—47)

The invention relates to the preparation of slurries of pulverous solids and water, starting from slurries of these solids and organic liquids that are volatile in steam, especially liquids such as hydrocarbons that are substantially immiscible with water.

The term "pulverous solids" is herein to be taken generically to mean separate (pulverulent) particles and also particles which exhibit a definite, though easily broken, cohesion as occurring for example in cakes obtained by filtering or centrifuging. The term "slurry" is used to include moist cake or systems containing less liquid than solids.

The invention is particularly of importance for those cases where the pulverous solids are polymers (including copolymers), particularly polymers and/or copolymers of alkenes. For brevity, pulverous solids will hereinafter be referred to as polymers.

Polymers, particularly polymers of alkenes, are in many cases produced as suspensions in organic liquids. As a rule, these liquids are hydrocarbons; in most cases they are more volatile than water.

In order to free the polymer of the organic liquid and at the same time recover the liquid, the suspension has, in prior practice, been mixed with water and the organic liquid was distilled off by the introduction of steam. This procedure had to be repeated more than once and took considerable time. At the end of it, the product contained a large amount of water, which had to be diminished by centrifuging before and further drying was possible.

The present invention provides an improved process for the removal of volatile organic liquid which has considerable advantages over the conventional method, particularly in its reduction of the number of operations, its simplification of the apparatus, its considerable shortening of the time required, and its economic use of energy.

The invention may be summarized as relating to a process for the preparation of slurries of pulverous solids and water, starting from slurries of these solids and volatile organic liquids, by evaporating the organic liquids with the use of steam, characterized in that, as the steam is introduced, velocities are attained which are more than 0.8 of the local sonic velocity, and that the heat needed for evaporating the organic liquid is produced entirely, or at least for the greater part, by condensation of the steam.

Local sonic velocity is the velocity of sound in the steam under the locally prevailing conditions of temperature and pressure.

High steam velocities, for example 0.9 of the local sonic velocity result in a more rapid and more thorough mixing of steam and polymer.

This effect is further heightened if, on introduction of the steam, supersonic velocities are attained, in particular if shock waves are set up in the steam which has expanded in the nozzle.

As is well known to those familiar in the art, supersonic velocities and shock waves are attained by appropriate adjustment of the pressure upstream and downstream of the nozzle, the shape of the nozzle and the temperature also exerting an influence on the result.

When steam is passed through a nozzle, it is found that in the narrowest section or throat, there is an increase in velocity and a drop in pressure compared to conditions at the entrance to the nozzle. If the difference between upstream and downstream pressures (with reference to the nozzle, and following the steam's direction of flow) is small, then the increase in the velocity occurring in the throat is also still relatively small. If, however, the ratio of downstream to upstream pressure (the expansion ratio) is decreased below a value slightly less than 1, the velocity increases considerably in the throat. At a certain value of the expansion ratio, herein called the first critical value, sonic volocity is reached in the throat. A further reduction in the expansion ratio does not further increase the throat velocity but causes the flow of steam just downstream of the throat to accelerate, at least initially, to supersonic velocities. In a certain front and at a certain distance downstream of the throat a shock occurs, which causes the steam to undergo a sudden, sharp rise in pressure and reduction in velocity. As the expansion ratio is further reduced, the shock front shifts further downstream. The expansion ratio reaches the second critical value when the shock front, where the shock waves are set up, is located just at the exit of the nozzle. If the expansion ratio is reduced still further, the shock waves are not set up in the steam until past the nozzle. Both the said critical pressure ratios are dependent on the divergence ratio in the section of the nozzle downstream of the throat, and also on the ratio of the specific heats $C_p/C_v$.

In particular, the situation where the shock does not occur in the steam until past the nozzle is preferred in the process according to the invention, since at the location where shock waves are set up the polymer can be easily introduced, which makes mixing even more thorough.

The variation of the expansion ratio to induce supersonic velocities and shock waves is well known to those familiar in the art. For a more detailed exposition, reference may be made to text books, such as N. A. Hall's "Thermodynamics of Fluid Flow" (Prentice-Hall, 1951).

The very high steam velocities and, above all, the shock waves set the polymer to be treated in very violent motion. During the shock waves a large amount of kinetic energy is released from the steam and steep temperature, pressure and velocity gradients, as well as a high degree of turbulence, are developed. As a result, the polymer, which is preferably introduced in the form of a moist cake, is rapidly disintegrated and, in a finely-divided state, mixed intimately with the steam. This fine dispersion makes it possible for the exchange of liquids in the polymer particles to be effected very rapidly.

The process according to the invention differs from mere mixing of the polymer mixture with a heated, high-volocity gaseous jet (see, e.g., U.S. Patent No. 2,297,726, Oct. 6, 1942, to Stephanoff) in that the heat is supplied principally by condensation of steam, thereby reducing the temperature fall of the steam during vaporization of the volatile liquid and introducing water into the polymer. Multiple-stage operation is also facilitated thereby. To this end it is usually desirable that the absolute temperature of the steam, when it engages the mixture, be below 1.1 times the saturation temperature.

The advantages of the new process over the conventional method for freeing polymers of volatile organic liquids may be summarized as follows:

(1) Reduction of the number of operations. The polymer cake does not have to be mixed with water before treatment with steam. Addition of wetting agent is also unnecessary. The product resulting from the steam treatment according to the invention contains much less water than the product that has been subjected to the conventional method, even if the later be centrifuged. Consequently, centrifuging of the polymer treated according to the invention can be omitted, and said polymer can be passed on directly to equipment for drying by contact with hot gases. (For example, this equipment may comprise drying shafts where the polymer is kept in a fluidized state by a rising flow of gas, or else drying drums rotating about gently inclined spindles.)

(2) Economy as regards energy consumption. The mechanical energy required for mixing is entirely supplied by the steam needed to supply heat for evaporation of the organic liquid.

(3) Simple apparatus. Since the steam gives quick and effective mixing, mechanical stirrers are superfluous.

(4) Time saving. The time required for replacing the organic liquids by water can, for example, be cut down from about an hour to a few milliseconds. As a result of this time saving which is significant enough in itself, the invention offers in addition new and interesting possibilities for the case when the materials to be treated will not stand much heating without deterioration.

The process of the invention is especially efficient if carried out in two or more stages. In this case it is preferred to bring the polymer moist, in each stage except one, into contact with steam which has already done service in the next stage. In between two stages, the polymer is separated from most of the vapors present at that point. Separation of vapor can be carried out very effectively by means of a cyclone. In the final stage the polymer comes into contact with live steam. This is introduced, according to the invention, by means of nozzles in which supersonic velocities are reached. If desired, supersonic velocities may be employed in the earlier stages as well, although it is quite sufficient to work with lower velocities here. In earlier stages, where only subsonic velocities occur, use may be made of nozzles without diverging sections.

If in this way a two-stage system is employed, in the first stage the polymer is heated by steam, so that most of the organic liquid evaporates and steam condenses. In the second stage, where live steam is introduced, a large proportion of the organic liquid still remaining is expelled from the polymer. The temperature rises relatively little in this stage and there is little evaporation and consequently little condensation of steam either; here, too, the sensible heat of the steam is utilized.

Although the process preferably starts from a polymer not containing more organic liquid than that retained after filtering or centrifuging, it is also quite possible for the steam treatment according to the invention to be applied to suspensions of the polymer, even to dilute suspensions where the polymer concentration amounts to only a few percent.

The process of the invention is particularly effective when the polymer has a relatively small grain size; but it need not be exceptionally small. An average grain size of 0.01 to 0.05 mm. may be very readily treated in this way. Grains of larger diameters, for instance up to 0.2 to 0.5 mm., can also be treated. The upper limit depends on its conveyability by the steam.

Figure 2:
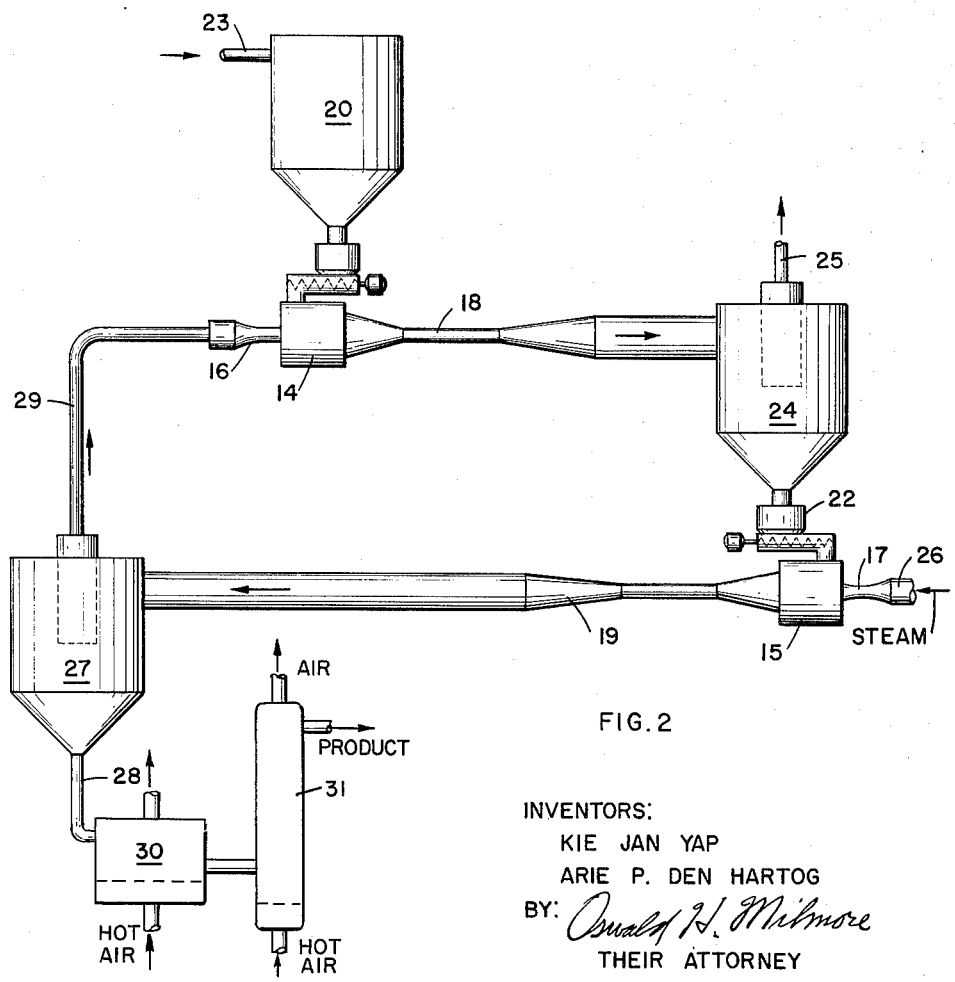

The invention may be further illustrated by reference to the appended drawings forming a part of this specification wherein:

FIGURE 1 is a longitudinal sectional view of a steam nozzle and mixing tube, together with auxiliary equipment shown diagrammatically; and FIGURE 2 is a diagrammatic view of a multi-stage plant using several units of the type shown in FIGURE 1.

Referring to FIGURE 1, the apparatus comprises a steam pipe 5 which terminates in a convergent-divergent nozzle 6 which may be of supersonic construction and issues into a mixing chamber 7. The chamber has an inlet opening 8 to which the slurry of polymer and volatile organic liquid is supplied by any feed device 9, such as a hopper and screw, which may be provided with suitable vibrating or other agitating devices to insure flow at the desired rate. Opposite and coaxial with the nozzle 6 is a mixing tube 10 which may be formed with a convergent section 11, a section 12 of constant diameter, and a divergent diffusing section 13.

The steam pressure is sufficient, in relation to that prevailing within the mixing chamber 7, to cause the steam jet issuing from the nozzle to have a high velocity, preferably at least 0.8 of the local sonic velocity and, in many instances, above sonic velocity. The pressure in the mixing nozzle is determined largely by that in the diffusing section 13. The material fed through the inlet 8 is accelerated by the steam jet and is disrupted into small particles by the high relative forward velocity of the steam jet. A principal shock front may be formed within this chamber, accompanied by a number of shock waves within the chamber, which lead to a sudden decrease in steam velocity and rise in temperature. This may be a condensation shock wave, provided the pressure in the chamber 7 is low enough and the initial steam is at or not far above saturation temperature, as previously indicated. Heat of condensation is transferred to the material admitted through the inlet 8, causing vaporization of the organic liquid therein. The mixture of steam, condensate, vaporized organic liquid and finely divided polymer flows through the tube 10, wherein further condensation of steam and vaporization of organic liquid occur. This affords time for steam condensation to reach equilibrium. The diffusion section 13 causes some recovery of pressure. The exact relations of the liquid, solid and vapor phases in said mixture is not known.

FIGURE 2 shows a two-stage plant employing the apparatus of FIGURE 1. Two mixing chambers 14 and 15, corresponding to chamber 7, are provided, each provided with a steam nozzle 16 or 17, a mixing tube 18 or 19, and feeders 20 or 22. The nozzle 16 shown does not have a divergent section; however, this is an optional arrangement. The initial slurry of polymer and volatile organic liquid is supplied through a conveying conduit 23 to the feeder 20 for admission to the chamber 14, which forms the first stage. There the slurry is engaged by the steam jet supplied from the nozzle 16, which is near sonic velocity. The resulting first mixture flows through the tube 18, causing vaporization of a major part of the organic liquid, and tangentially into a cyclone 24, wherein the polymer and liquid are separated from the vapors; the latter fraction is discharged at 25, at atmospheric or subatmospheric pressure. The polymer slurry, consisting of solids and water and a reduced amount of organic liquid, flows through the feeder 22 and into the mixing chamber 15, which forms the second stage and wherein it is engaged by a supersonic steam jet from the nozzle 17, formed by admitting live steam via a pipe 26. The resulting second mixture now flows through the tube 19 wherein further vaporization of the organic liquid and condensation of steam occurs, and thence tangentially into a second cyclone 27 wherein a product slurry of polymer and condensate is separated from vapor, the former being discharged at 28 and the latter through a vapor line 29. The line 29 is connected to the nozzle 16 for supplying steam to the first stage. The product slurry may be dried with hot air in a unit 30 and further dried by fluidizing air in a drying shaft 31. The last-mentioned steam contains a small amount of vaporized organic liquid.

The plant may, of course, include any desired number of stages. Also, when a larger capacity is desired a plurality of nozzles may be mounted side by side within each stage, e.g., arranged parallel to each other in a ring.

*Example*

The process of the invention was applied to a polypropylene-insolvent slurry, obtained by polymerizing propylene with a catalyst system consisting essentially of titanium trichloride and aluminum dietheyl chloride in a reaction medium consisting substantially of a gasoline fraction having a boiling range of 85°–115° C.

The slurry was treated in two stages according to the scheme shown in FIGURE 2. The second stage was constructed as is shown for FIGURE 1, using a convergent-divergent nozzle having a throat diameter of 3 mm. and an outlet diameter of 6 mm., and live steam was supplied to the nozzle 17, and discharged therefrom at supersonic velocity. The entrance to the tube 19 has a diameter of about 10 mm. In the first stage the dimensions of the nozzle throat and tube 18 were about 1.5 times as large as in the second stage, and the nozzle differed in that it was not provided with a divergent section, whereby the jet formed was sub-sonic although close to sonic. The cyclones 24 and 27 were 50 cm. high and 20 cm. in diameter at their widest parts. The capacity of the apparatus was 100 kg. of dry polymer per hour.

The polymer slurry was concentrated by centrifuging, and the concentrated slurry supplied to the first stage contained 2.3 kg. of gasoline per kg. of dry polymer. In the following, the quantities of steam and gasoline are always given in kg. per kg. of dry polymer.

In the first stage, the polymer, having a temperature of 60° C., came into contact with 1.7 kg. of steam at 111° C. and 1.5 atm. abs. (measured upstream from the nozzle 16). The material leaving the first stage had a temperature of 90° C. The polymer slurry leaving the first stage contained 0.03 kg. of gasoline and 0.8 kg. of water. The vapors leaving the first stage consisted of 2.3 kg. of gasoline and 0.9 kg. of steam at 1 atm. abs.

In the second stage the polymer slurry, containing 0.03 kg. of gasoline and 0.8 kg. of water, came into contact with 1.7 kg. of live steam at 145° C. and 4 atm. abs. (measured upstream of the nozzle 17). The material leaving the second stage was at a temperature of 111° C. The product polymer slurry leaving this stage contained 0.001 kg. of gasoline and 0.8 kg. of water. The vapors leaving this stage contained a small quantity of gasoline and 1.7 kg. of steam at 1.5 atm. abs.

Judged by its appearance, the polymer produced by subjecting the product slurry from the cyclone 24 to hot air in a unit 30, was then a dry, free-flowing, that is to say, non-cohesive, powder. It was immediately passed on for further drying to a drying shaft 31, where it was kept in a fluidized state by a rising stream of hot air.

We claim as our invention:

1. A process for preparing a product slurry of pulverous solids and water starting from an initial slurry of said solids and a volatile organic liquid, which comprises the steps of:
    (a) forming a jet of steam having a velocity greater than 0.8 the sonic velocity at the prevailing temperature and pressure by flow through a nozzle,
    (b) admitting said initial slurry into said steam jet,
    (c) evaporating said volatile organic liquid by providing the heat of evaporation therefor principally by condensing steam from said steam jet in the resulting mixture of steam condensate, said solids and vapor, the latter comprising vaporized organic liquid together with any uncondensed steam, and
    (d) separating a product slurry containing said condensate and solids from said vapor.

2. A process as defined in claim 1 wherein said steam jet has a velocity in excess of sonic velocity and a shock wave is formed downstream from the nozzle.

3. A process as defined in claim 1 wherein said solids are polymers of unsaturated hydrocarbons.

4. A process as defined in claim 1 wherein said solids are polymers of alkenes and said organic liquid is a hydrocarbon.

5. A multi-stage process for the preparation of a product slurry of pulverous solids and water, starting from an initial slurry of said solids and a volatile organic liquid, which comprises the steps of:
    (a) forming a jet of steam having a velocity greater than 0.8 times the sonic velocity at the prevailing temperature and pressure by flow through a nozzle,
    (b) admitting said initial slurry into said steam jet,
    (c) evaporating said volatile organic liquid by providing the heat of evaporation therefor principally by condensing steam from said steam jet and thereby forming a first mixture of steam condensate, said solids and a residue of said organic liquid, and a first vapor comprising vaporized organic liquid together with any uncondensed steam,
    (d) separating a first slurry containing said condensate, solids and residue of organic liquid from said first vapor,
    (e) forming a second jet of steam having a velocity greater than 0.8 times the sonic velocity at the prevailing temperature and pressure by flow through a second nozzle,
    (f) admitting the separated first slurry into said second steam jet,
    (g) evaporating said residue of organic liquid from said first slurry principally by condensing only a part of said second steam jet, thereby forming a second mixture of steam condensates, said solids and a second vapor comprising steam and vaporized organic liquid,
    (h) separating said second vapor from said second mixture, and
    (i) flowing the separated second vapor to the first-mentioned nozzle to form said first-mentioned jet.

6. Process as defined in claim 5 wherein the first-mentioned jet has a velocity which is not substantially above sonic velocity and said second jet has a velocity in excess of sonic velocity.

References Cited by the Examiner

UNITED STATES PATENTS

| | | | |
|---|---|---|---|
| 2,316,670 | 4/1943 | Colgate et al. | 159—48 X |
| 2,353,459 | 7/1944 | Gruber | 159—48 X |
| 2,353,912 | 7/1944 | Lindsay | 159—3 X |
| 2,413,420 | 12/1946 | Stephanoff | 34—10 |
| 2,561,394 | 7/1951 | Marshall | 117—100 |
| 2,806,523 | 9/1957 | Nicolaisen | 159—48 |
| 2,859,155 | 11/1958 | Cichelli et al. | 159—48 X |
| 2,887,390 | 5/1959 | Coulter et al. | 159—4 |
| 2,957,855 | 10/1960 | McLeod | 260—88.2 |
| 3,042,637 | 7/1962 | Crouch | 260—17.5 |
| 3,076,795 | 2/1963 | Hall | 260—94.7 |

FOREIGN PATENTS 292,137  11/1928  Great Britain.

NORMAN YUDKOFF, *Primary Examiner.*